(12) United States Patent
Westland (10) Patent No.: US 11,232,439 B2
(45) Date of Patent: Jan. 25, 2022

(54) METHODS AND SYSTEMS FOR PREVENTING TRANSACTION TRACING ON DISTRIBUTED LEDGER-BASED NETWORKS

(71) Applicant: EYGS LLP, London (GB)

(72) Inventor: Duncan James Westland, Addlestone (GB)

(*) Notice: Subject to any disclaimer, the term of this patent is extended or adjusted under 35 U.S.C. 154(b) by 0 days.

(21) Appl. No.: 16/869,944

(22) Filed: May 8, 2020

(65) Prior Publication Data
US 2021/0042746 A1 Feb. 11, 2021

Related U.S. Application Data

(60) Provisional application No. 62/884,745, filed on Aug. 9, 2019.

(51) Int. Cl.
| | | |
|---|---|---|
| *G06Q 20/38* | (2012.01) | |
| *H04L 9/06* | (2006.01) | |
| *G06F 16/23* | (2019.01) | |
| *G06Q 20/06* | (2012.01) | |

(52) U.S. Cl.
CPC ..... *G06Q 20/3827* (2013.01); *G06F 16/2379* (2019.01); *G06Q 20/065* (2013.01); *H04L 9/0643* (2013.01)

(58) Field of Classification Search
CPC .................................................. G06Q 20/3827
See application file for complete search history.

(56) References Cited

U.S. PATENT DOCUMENTS

| | | | |
|---|---|---|---|
| 5,892,900 A | 4/1999 | Ginter et al. | |
| 9,397,985 B1 | 7/2016 | Seger, II et al. | |
| 9,608,829 B2 | 3/2017 | Spanos et al. | |
| 9,785,369 B1 | 10/2017 | Ateniese et al. | |
| 9,794,074 B2 | 10/2017 | Toll et al. | |
| 9,870,508 B1 | 1/2018 | Hodgson et al. | |
| 9,881,176 B2 | 1/2018 | Goldfarb et al. | |
| 9,906,513 B2 | 2/2018 | Wuehler | |
| 9,942,231 B1 | 4/2018 | Laucius et al. | |

(Continued)

FOREIGN PATENT DOCUMENTS

| | | |
|---|---|---|
| CN | 107274184 A | 10/2017 |
| CN | 110033377 A | 7/2019 |

(Continued)

OTHER PUBLICATIONS

International Search Report and Written Opinion for International Application No. PCT/US2019/056646, dated Jan. 15, 2020, 12 pages.

(Continued)

*Primary Examiner* — John W Hayes
*Assistant Examiner* — Zehra Raza
(74) *Attorney, Agent, or Firm* — Cooley LLP (57) ABSTRACT

Some embodiments disclose the use of zero-knowledge proofs (ZKPs) to prevent or at least mitigate privacy compromises that can occur to transactions conducted on distributed ledger-based networks (DLNs). In particular, some embodiments disclose methods and systems where ZKPs can be used to keep confidential or at least mitigate public revelation of private transaction data due to the analyses of the transaction fee or gas paid to facilitate the transaction on the DLN.

15 Claims, 3 Drawing Sheets

(56) References Cited

U.S. PATENT DOCUMENTS

| | | | |
|---|---|---|---|
| 9,948,467 B2 | 4/2018 | King | |
| 9,959,065 B2 | 5/2018 | Ateniese et al. | |
| 10,026,118 B2 | 7/2018 | Castinado et al. | |
| 10,298,395 B1* | 5/2019 | Schiatti | H04L 9/3221 |
| 10,438,290 B1* | 10/2019 | Winklevoss | G06Q 20/223 |
| 10,540,654 B1 | 1/2020 | James et al. | |
| 10,721,069 B2 | 7/2020 | Konda et al. | |
| 2009/0204517 A1 | 8/2009 | Edens et al. | |
| 2012/0108446 A1 | 5/2012 | Wu et al. | |
| 2014/0109245 A1 | 4/2014 | Pestell | |
| 2015/0018406 A1 | 1/2015 | Glimcher et al. | |
| 2016/0260169 A1 | 9/2016 | Arnold et al. | |
| 2016/0358165 A1 | 12/2016 | Maxwell | |
| 2017/0091750 A1 | 3/2017 | Maim | |
| 2017/0278100 A1 | 9/2017 | Kraemer et al. | |
| 2017/0293503 A1 | 10/2017 | Curtis | |
| 2017/0316162 A1 | 11/2017 | Wall Warner et al. | |
| 2017/0346639 A1 | 11/2017 | Muftic | |
| 2018/0048461 A1 | 2/2018 | Jutla et al. | |
| 2018/0082043 A1 | 3/2018 | Witchey et al. | |
| 2018/0101701 A1 | 4/2018 | Barinov et al. | |
| 2018/0139043 A1 | 5/2018 | Jayachandran et al. | |
| 2018/0165131 A1 | 6/2018 | O'Hare et al. | |
| 2018/0189753 A1 | 7/2018 | Konda et al. | |
| 2018/0218176 A1 | 8/2018 | Voorhees et al. | |
| 2018/0218469 A1 | 8/2018 | Lert, Jr. et al. | |
| 2018/0237863 A1 | 8/2018 | Namsaraev et al. | |
| 2019/0007381 A1 | 1/2019 | Isaacson et al. | |
| 2019/0012662 A1 | 1/2019 | Krellenstein et al. | |
| 2019/0034923 A1 | 1/2019 | Greco et al. | |
| 2019/0080407 A1 | 3/2019 | Molinari et al. | |
| 2019/0130701 A1* | 5/2019 | Simons | H04L 9/0643 |
| 2019/0164153 A1 | 5/2019 | Agrawal et al. | |
| 2019/0164223 A1 | 5/2019 | de Jong | |
| 2019/0279204 A1 | 9/2019 | Norton et al. | |
| 2019/0299105 A1 | 10/2019 | Knight et al. | |
| 2019/0385156 A1 | 12/2019 | Liu | |
| 2020/0034834 A1 | 1/2020 | Li et al. | |
| 2020/0059361 A1 | 2/2020 | Konda et al. | |
| 2020/0059362 A1 | 2/2020 | Brody et al. | |
| 2020/0059364 A1 | 2/2020 | Konda et al. | |
| 2020/0322154 A1 | 10/2020 | Konda et al. | |
| 2020/0327473 A1 | 10/2020 | Zur et al. | |
| 2020/0328893 A1 | 10/2020 | Westland | |
| 2020/0351093 A1 | 11/2020 | Madhuram et al. | |
| 2020/0351094 A1 | 11/2020 | Canterbury | |

FOREIGN PATENT DOCUMENTS

| | | |
|---|---|---|
| WO | WO 2017/187395 | 11/2017 |
| WO | WO 2017/198891 | 11/2017 |
| WO | WO 2018/007828 | 1/2018 |
| WO | WO 2018/028777 | 2/2018 |
| WO | WO 2018/144302 | 8/2018 |
| WO | WO 2018/150275 | 8/2018 |
| WO | WO 2018/163044 | 9/2018 |
| WO | WO 2018/209153 | 11/2018 |

OTHER PUBLICATIONS

Office Action for U.S. Appl. No. 16/283,452, dated Jul. 10, 2019, 31 pages.

Office Action for U.S. Appl. No. 16/283,452, dated Nov. 6, 2019, 34 pages.

International Search Report and Written Opinion for International Application No. PCT/US2019/046532, dated Dec. 2, 2019, 10 pages.

International Search Report and Written Opinion for International Application No. PCT/US2019/046808, dated Dec. 2, 2019, 9 pages.

International Search Report and Written Opinion for International Application No. PCT/US2019/057246, dated Feb. 4, 2020, 8 pages.

International Search Report and Written Opinion for International Application No. PCT/US2019/057262, dated Jan. 24, 2020, 9 pages.

International Search Report and Written Opinion for International Application No. PCT/EP2020/060588, dated Jun. 24, 2020, 13 pages.

International Search Report and Written Opinion for International Application No. PCT/US2020/028128, dated Jun. 25, 2020, 9 pages.

Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7 . . . ], Retrieved on Aug. 27, 2018, 11 pages.

Ben-Sasson, E. et al., "Scalable, transparent, and post-quantum secure computational integrity," Cryptology ePrint Archive, Report 2018/046 (2018), 83 pages.

International Telecommunication Union, Telecommunication Standardization Sector, Focus Group on Application of Distributed Ledger Technology, DLT-O-067, Output Document, "Updated baseline text: D4.1—DLT regulatory framework," Apr. 2019, 45 pages.

Lee, C. H. et al., "Implementation of IoT system using blockchain with authentication and data protection," 2018 International Conference on Information Networking (ICOIN), IEEE, Jan. 10, 2018, pp. 936-940.

Menezes, A. et al., "Key Management Techniques," Chapter 13 in Handbook of Applied Cryptography, CRC Press, Boca Raton, FL, (1996), pp. 543-590.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

Parno, B. et al., "Pinocchio: Nearly practical verifiable computation," S&P (2013), 16 pages.

Groth, J et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Wu, H., "DIZK: Distributed zero-knowledge proof systems," In USENIX Security (2018), 35 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Zhang, Y. et al., "Z-Channel: Scalable and efficient scheme in zerocash," 2017, [Online], Retrieved from the Internet: https://eprint.iacr.org/2017/684, pp. 1-39.

Wang, X. et al., "STAMP: Enabling Privacy-Preserving Location Proofs for Mobile Users," IEEE/ACM Transactions on Networking, vol. 24, No. 6, Dec. 2016, pp. 3276-3289.

Kosba, A. et al., "Hawk: The Blockchain Model of Cryptography and Privacy-Preserving Smart Contracts," 2016 IEEE Symposium on Security and Privacy, May 2016, pp. 839-858.

International Search Report and Written Opinion for International Application No. PCT/EP2020/072325, dated Nov. 6, 2020, 11 pages.

International Search Report and Written Opinion for International Application No. PCT/US2020/061243, dated Feb. 22, 2021, 12 pages.

International Search Report and Written Opinion for International Application No. PCT/US2021/027448, dated Jul. 23, 2021, 11 pages.

Office Action for U.S. Appl. No. 16/904,296, dated Jun. 10, 2021, 27 pages.

Office Action for U.S. Appl. No. 16/952,949, dated Jun. 15, 2021, 23 pages.

Shahid, A. et al., "Blockchain-based agri-food supply chain: A complete solution," IEEE Access, IEEE, vol. 8, Apr. 2020, pp. 69230-69243.

Westerkamp, M. et al., "Blockchain-based supply chain traceability: Token recipes model manufacturing processes," 2018 IEEE Confs on Internet of Things, Green Computing and Communications, Cyber, Physical and Social Computing, Smart Data, Blockchain, (56) References Cited

OTHER PUBLICATIONS

Computer and Information Technology, Congress on Cybermatics, IEEE, Jul. 2018, pp. 1595-1602.

* cited by examiner

METHODS AND SYSTEMS FOR PREVENTING TRANSACTION TRACING ON DISTRIBUTED LEDGER-BASED NETWORKS

CROSS-REFERENCE TO RELATED PATENT APPLICATION

This application claims priority to and the benefit of U.S. Provisional Application No. 62/884,745, filed Aug. 9, 2019, entitled "Methods and Systems for Preventing Transaction Tracing on Distributed Ledger-Based Networks," which is incorporated herein by reference in its entirety.

FIELD OF THE DISCLOSURE

Distributed ledger-based networks (DLNs) dispense with the need for a central authority to manage the operations of the networks due to their transparency and consensus-based verification mechanisms for validating actions occurring on the DLNs, which allow participants of the networks to trust the accuracy of the validations without the central authority. The transparency and consensus-based verification mechanisms, however, compromise the privacy of the actions and the involved parties, as relevant information has to be shared with at least a substantial portion of the participants of the DLNs for the actions to be validated. The disclosure illustrates how the privacy of such actions can be enhanced with the use of zero-knowledge proofs (ZKPs) that can be used to prevent the tracing of transaction details. The disclosure discloses methods and systems that are directed at preventing transaction tracing for transactions conducted on ZKP-enabled DLNs.

BACKGROUND

Organizations can use private networks as well as public networks such as the internet and distributed ledger-based networks (DLNs) to manage and track transactions occurring between participants of the networks. The use of private networks, however, can be inefficient and costly, while public networks may not provide the desired level of privacy, such as the tracing of participants of transactions that were intended to be private or confidential.

DETAILED DESCRIPTION

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale of a digital music file can use a self-executing code or program (e.g., a smart contract) on the DLN (e.g., a blockchain) to manage the sale of the music file. The self-executing code or smart contract can regulate the exchange of the music file and the correct payment for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer).

In some embodiments, a DLN can be and/or support a blockchain. Throughout the instant disclosure, in some embodiments, the terms "distributed ledger-based network" and "blockchain network" may be used interchangeably. Similarly, in some embodiments, the terms "self-executing code" or "self-executing code segment" and "smart contract" may be used interchangeably. Further, in some embodiments, the term "transaction" may be used to refer to off-chain transactions (e.g., transactions involving the sale of physical or digital assets between parties) and/or on-chain representation of these off-chain transactions (e.g., the transaction of tokens that represent the assets on the blockchain network). Whether the term refers to the former or the latter case should be clear from context. The terms "off-chain" or "off-the DLN" are to be understood to mean "not on the blockchain network" or "not on the DLN." For example, a statement such as "the application of a hashing function is performed off-the DLN" is to be understood as meaning "the application of the hashing function is not performed on the DLN (and is performed elsewhere (e.g., at a computing node that is not part of the DLN))".

As noted above, in some embodiments, the trust the distributed ledger-based networks provide without a need for a central authority derives from the transparency of the networks to at least all the participants of the network (and in the case of public networks, to the public at large). This transparency, however, can reduce or even eliminate any privacy or confidentiality that participants need or seek when interacting with the network or its participants. For example, in the case of public networks, any interested person can access and inspect the distributed ledgers on the networks to obtain detailed information on all transactions that are represented on the ledgers since the inception of the networks (as the ledgers are, in at least most cases, largely immutable). In some implementations, the lack of privacy or confidentiality can render the use of a public ledger-based network untenable. For instance, a pharmacy using a public blockchain network to manage the fulfillment of orders for shipment of prescription drugs without a mechanism to conceal at least some aspects of the transaction would publicly expose personal and health-related data of its customers (thereby violating their privacy and possibly health privacy laws).

In some cases, private DLNs can be used to provide participants a measure of privacy that may not be available on public networks. The privacy afforded by private (non-ZKP-enabled) DLNs, however, is far from adequate for most purposes. For example, with reference to the above example, the personal and health-related data of customers would still be available for inspection by other members of the private DLN (even if the data is hidden from the public). Further, private DLNs would be burdensome to maintain as, amongst other reasons, applications developed for public blockchain networks would not seamlessly interoperate on private blockchain networks.

In some embodiments, the level of privacy and security available on DLNs (e.g., private or public DLNs) may be enhanced via the implementation of ZKPs in the DLNs, the details of which are discussed in Applicant's own EYGL-011/00US (E&Y IDF 18-014) application). In some implementations, a ZKP-enabled DLN may provide at least increased level of privacy to transaction participants while still retaining the level of trust that is afforded by decentralized networks (i.e., with no central authority). For instance, a ZKP-enabled DLN (e.g., ZKP-enabled public DLN) can be used to facilitate a transaction (e.g., a sale or transfer of an asset between parties) without revealing publicly or to other participants of the ZKP-enabled DLN details of the transaction such as but not limited to identities of the transacting parties, the assets being transferred as part of the transaction, the tokens representing the assets on the ZKP-enabled DLN (e.g., non-fungible tokens representing off-DLN assets on the ZKP-enabled DLN) and/or the like. Referring to the example provided above, the use of a ZKP-enabled public DLN may allow the pharmacy to use a public blockchain network (i.e., the ZKP-enabled public DLN) to facilitate the shipment of the drugs without revealing on the blockchain network (or publicly) any identifying information related to the assets (i.e., the drugs), the transaction participants (i.e., the pharmacy and/or the clients).

In some embodiments, the identity of the transaction participants on a ZKP-enabled public DLN may be revealed, however, from an analysis of payments that may be made to facilitate the occurrence of a transaction on the ZKP-enabled public DLN. For example, a first transacting party that is transferring funds for receiving or buying an asset from a second transacting party may pay a small amount of funds (e.g., tokens, ether tokens on the Ethereum blockchain) to so-called miners of the ZKP-enabled DLN to facilitate the execution of the transaction. As an example illustration, if the ZKP-enabled DLN is an Ethereum blockchain onto which ZKPs are implemented, the miners of the ZKP-enabled Ethereum blockchain network may be tasked with, and be paid a transaction fee for, ascertaining at least some aspects of the transaction such as, but not limited to, the correctness of any updates to the Ethereum blockchain state that the transaction would create. In such implementations, the transaction fee being paid for facilitating the transaction (e.g., so-called "gas") may originate from an account of the payor (e.g., an account on the ZKP-enabled DLN or an account of the payor at some crypto-exchange). In some cases, an analysis of transaction fees paid to facilitate transactions may reveal the identity of the payor and/or the account of the payor, the identities and/or accounts of other parties that participated in the transaction such as the payee, and/or the like, compromising the enhanced privacy attained on the ZKP-enabled DLN as a result of the implementation of ZKPs on the DLN. As such, a need exists to reduce or prevent the tracing of details of transactions conducted on ZKP-enabled DLNs, a non-limiting example of which includes the so-called "gas tracing" where identities of transaction participants are revealed or discovered via an analysis of transaction fees (e.g., "gas" payments paid on the Ethereum blockchain) to facilitate the transaction.

Figure 1:
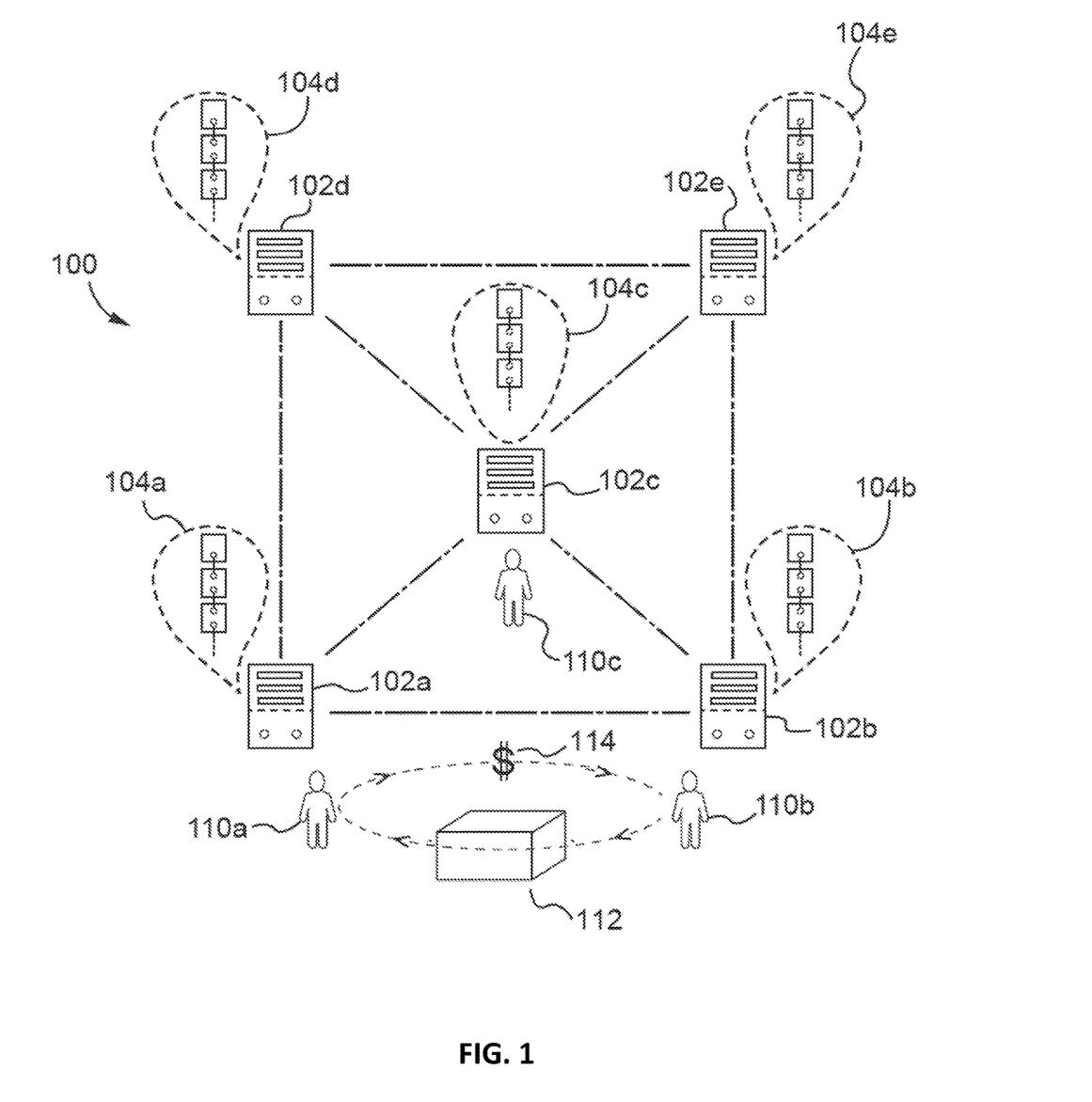
FIG. 1 shows a distributed ledger-based network configured for use in managing and conducting a private transaction between two parties that are participants of the network, according to some embodiments.

FIG. 1 shows a ZKP-enabled DLN configured for use in managing and representing a private transaction between two parties that are participants of the network, in particular a public network, according to some embodiment. In some embodiments, the ZKP-enabled DLN or blockchain network 100 includes a plurality of computing nodes 102a-102e configured to communicate amongst each other via a peer-to-peer (P2P) connection. In some implementations, the computing nodes 102a-102e can be computing devices including but not limited to computers, servers, processors, data/information processing machines or systems, and/or the like, and may include data storage systems such as databases, memories (volatile and/or non-volatile), etc. In some implementations, the P2P connections may be provided by wired and/or wireless communications systems or networks (not shown) such as but not limited to the internet, intranet, local area networks (LANs), wide area networks (WANs), etc., utilizing wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate amongst each other with the results of the executions of their respective self-executing codes, for example, to arrive at a consensus on the results. In some implementations, one or a few of the computing nodes 102a-102e may have self-executing codes that self-execute, and the results would be transmitted to the rest of the computing nodes 102a-102e for confirmation.

In some embodiments, a self-executing code or a smart contract can facilitate the completion of transactions on the ZKP-enabled DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music, etc. Further, the smart contract can facilitate the exchange of the music file by allowing the transfer of a payment to occur only after the transfer of the music file is completed (and validated).

In some embodiments, the ZKP-enabled DLN 100 may be linked to one or more oracles (not shown) or data feeds that provide external data to the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. For example, a transaction between transacting parties 110a, 110b for party 110a to buy an event ticket from party 110b may be dependent on a weather condition (e.g., the weather condition may determine whether the event can occur or may have to be cancelled), and the smart contract may execute the transaction only when the oracle has received the weather information and the condition is fulfilled.

In some embodiments, at least a substantial number of the computing nodes 102a-102e (e.g., at least greater than 50%, 60%, 75%, 90%, including values and subranges therebetween, of the total number of computing nodes 102a-102e that make up the ZKP-enabled DLN 100) include copies of a distributed ledger 104a-104e onto which transactions that occur on the network are recorded. In some implementations, the recording of the transactions on the distributed ledger 104a-104e may occur when some substantial number of the computing nodes 102a-102e, or a subset thereof, agree on the validity of the transactions. The distributed ledger 104a-104e can be immutable or nearly immutable in the sense that to alter the distributed ledger 104a-104e, at least this substantial portion of the computing nodes 102a-102e would have to agree, which can be increasingly difficult when the number of computing nodes 102a-102e is large (and the distributed ledger 104a-104e gets longer).

As noted above, the ZKP-enabled DLN 100 can be used to facilitate transactions that involve digital assets as well as transactions of assets that occur off-chain or off-ZKP-enabled DLN 100 where the physical assets can be represented on the ZKP-enabled DLN 100 by token or token commitments (e.g., as discussed in the aforementioned Applicant's own EYGL-011/00US (E&Y IDF 18-014) application). In some implementations, a token commitment may encode at least some aspects of the asset and ownership rights thereof. For instance, for digital assets (e.g., cryptocurrencies, etc.) and/or physical assets (e.g., real world physical products, etc.) identified or represented by digital asset tokens and/or physical asset tokens, respectively, owned by a participant of the ZKP-enabled DLN 100, the token commitment may be obtained by cryptographically hashing, among other thigs, the digital asset tokens and/or physical asset tokens, respectively, and the public key on the ZKP-enabled DLN 100 of the owner of the digital asset. In some instances, a physical asset token that identifies a physical asset may be obtained by hashing some identifying parameters (e.g., serial numbers, model numbers, etc.) of the physical asset. As a non-limiting example illustration, a token commitment to represent an asset on the ZKP-enabled DLN 100 can be obtained by computing $Z=H(S⊛P_k⊛A)$, where A is the asset token identifying the asset (e.g., a digital asset token of a cryptocurrency or a physical asset token obtained by hashing, off-chain, at least some identifying parameters of a physical asset), $P_k$ is the public key on the ZKP-enabled DLN 100 that is associated with the owner of the asset, S is a random nonce, H is a cryptographic hashing function or algorithm (e.g., SHA-256), and C) represents a combining operator (e.g., the concatenation operator |, etc.). In some instances, the random nonce S can be used to differentiate between two token commitments (e.g., an expired or invalidated one and a newly minted one) that represent the same asset and ownership rights. In some implementations, the random nonce S and/or the private key associated with the public key $P_k$ can be used to invalidate on the ZKP-enabled DLN 100 the token commitment Z, as discussed in more details below.

In some implementations, a first transaction participant 110a may wish to purchase an asset 112 from the second transaction participant 110b, the asset being a digital asset (e.g., digital music files) or an off-chain asset (e.g., physical assets (e.g., books)). In the latter case, the off-chain asset can be represented on the ZKP-enabled DLN 100 by tokens and the sale or transfer of the off-chain assets can be represented on the ZKP-enabled DLN 100 by the transfer of the tokens between the blockchain or ZKP-enabled DLN 100 accounts of the transacting parties. In such implementations, the first transaction participant 110a may pay a transaction fee (e.g., "gas") to a participant of the ZKP-enabled DLN 100 (e.g., 110c) that performs the computations needed to execute the transaction and share the results with the rest of the ZKP-enabled DLN 100 so that the results can be recorded on at least a substantial number of the distributed ledger 104a-104e when a corresponding substantial number of the computing nodes 102a-102e verify the computations. For example, the computations may include verifying that the ZKP-enabled DLN 100 account of the first transaction participant 110a (i.e., payor 110a) holds at least adequate resources (e.g., tokens) 114 to pay for the asset 112. In some implementations, as an analysis of the transaction fee or gas paid to facilitate the transaction can expose details of the transaction that are otherwise kept confidential via the implementation of ZKPs in the ZKP-enabled DLN 100, the payor 110a may wish to hide the payments (e.g., including the payment of the gas) as discussed below with reference to FIGS. 2A-B to reduce or prevent the tracing of details of the transaction, including the identity of the first transaction participant 110a, by third parties.

In some implementations, as discussed below in more details, the payor 110a may not transfer the payment 114 (e.g., payment 114 for the purchased asset 112 and/or transaction fee to facilitate the transaction) directly to the smart contract of the ZKP-enabled DLN 100 to avoid the tracking of the transaction by a third party, an example of transaction tracking including the tracing of the transaction fee. For example, a third party may attempt to trace the movement of the transaction fee (i.e., so-called "gas tracing") from some crypto-exchange account of the payor 110a to the smart contract for ultimate transfer to the miner on the ZKP-enabled DLN 100 that performed the computations to verify details of the transactions. In such implementations, to avoid or at least frustrate the tracking of the transaction fee, the payor 110a may not transfer the payment 114 (e.g., which may include transaction fee in addition to the payment for the purchased asset 112) to the smart contract, but rather transfer the payment 114 anonymously to another participant of ZKP-enabled DLN 100 (i.e., "relayer") so that the relayer can relay the payment 114 to the payee 110b anonymously (e.g., without any knowledge that the payment came to the off-chain from the payor 110a). In such implementations, the relayer may not be privy to the identities of the payor 110a, the payee 110b, the asset 112 that is transferred, and/or the like. The relayer (e.g., 110c) may not be aware of the identities of the payor 110a, the payee 110b, the asset 112 that is transferred, and/or the like, as the relayer receives (e.g., via the computing node 102c) a ZKP from the payor 110a that hides all these information from the relayer while still proving to the relayer the accuracy of the information included in the ZKP, as discussed below. In some implementations, any party that performs an analysis of the movement of the transaction fee to reveal details of the transaction may be stymied or at least substantially frustrated as the link between the relayer that submitted the payment 114 and the payor 110a is hidden (e.g., since the payor 110a submitted the payment to the relayer anonymously).

Figure 2A:
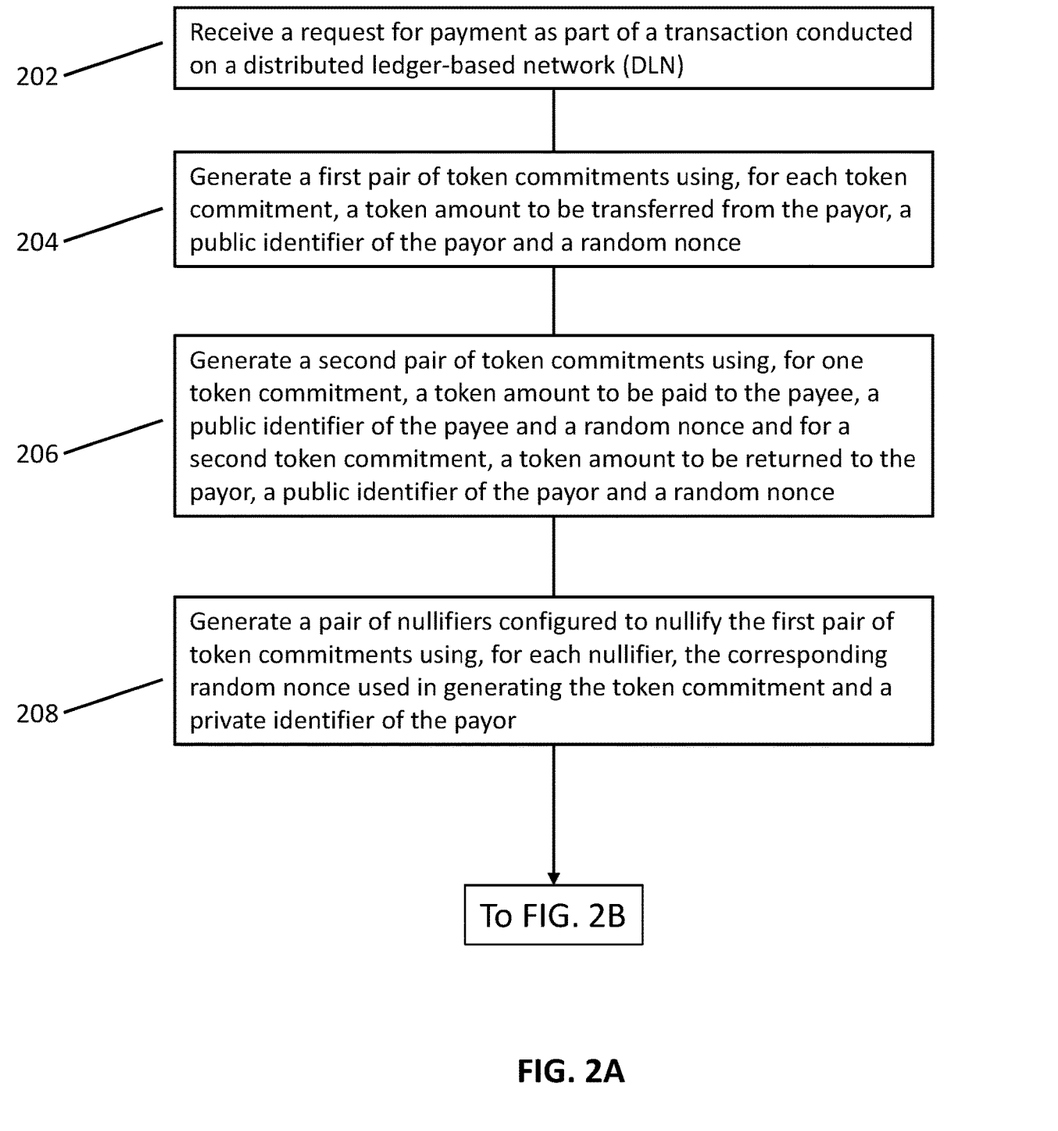
FIGS. 2A-B show a flow chart illustrating the reduction or prevention of transaction tracking including gas tracing for transactions conducted on zero knowledge proof-enabled distributed ledger-based network, according to some embodiments.
Figure 2B:
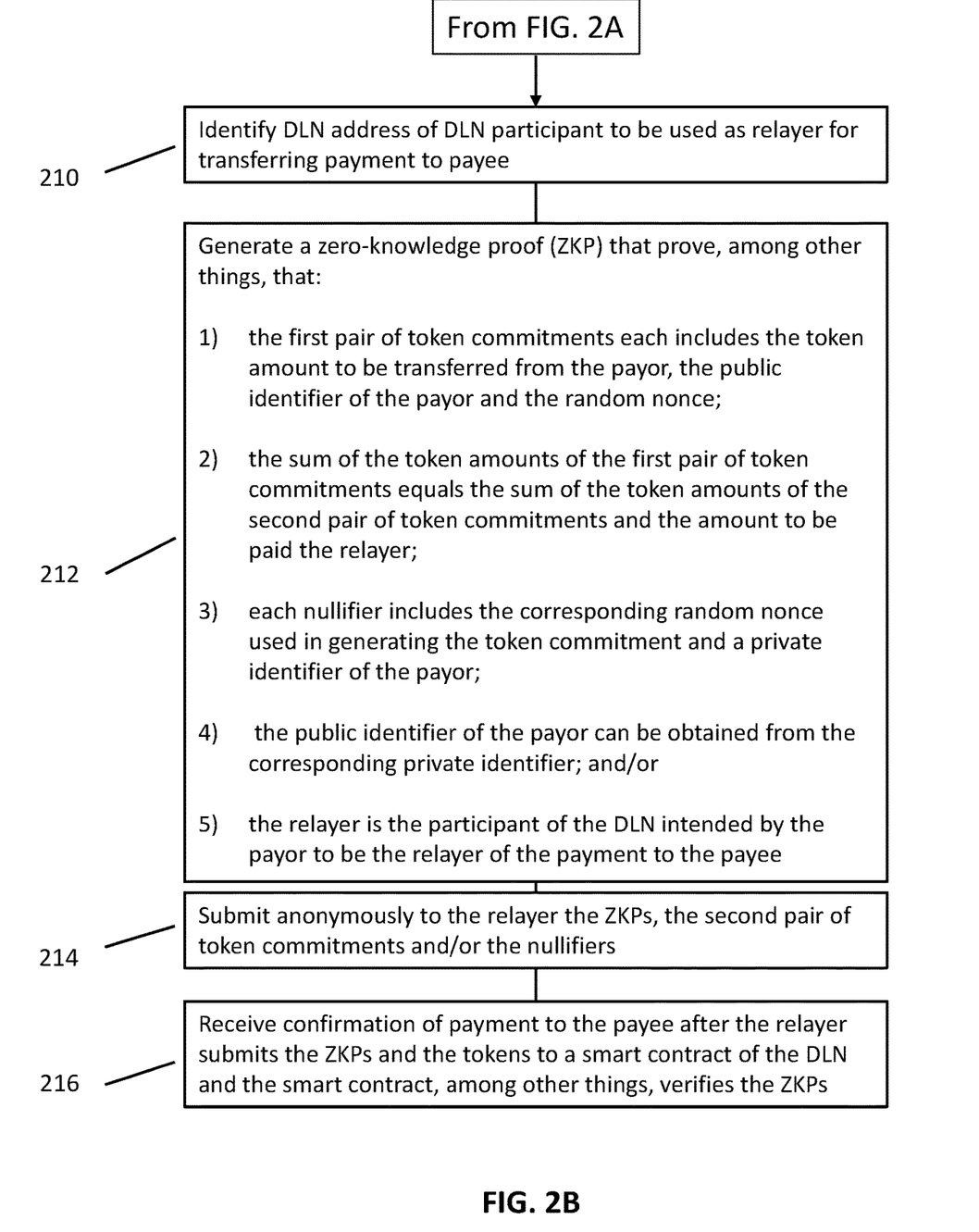

FIGS. 2A-C show a flow chart illustrating the reduction or prevention of transaction tracking including gas tracing for transactions conducted on zero knowledge proof-enabled distributed ledger-based network, according to some embodiments. An example transaction can be a transaction including the sale of a digital asset 112 that is conducted on the ZKP-enabled DLN 100 or the sale of a physical off-chain asset 112 that is represented on the ZKP-enabled DLN 100 with the transfer, between the payor 110a and payee 110b, of tokens (e.g., token commitments) representing the physical off-chain asset 112 on the ZKP-enabled DLN 100. In return, in some implementations, the payor 110a may transfer, using the computing node 102a, payment tokens (e.g., coins) to the payee 110b (e.g., to an account of the payee 110b on the ZKP-enabled DLN 100). For example, if the ZKP-enabled DLN is an Ethereum blockchain, the payor 110a may transfer, using the computing node 102a, so-called ether tokens to the payee 110b. In some implementations, the transfer of the payment 114, which may include the transaction fee (e.g., gas) to be paid to third parties (e.g., so-called miners on the ZKP-enabled DLN 100) for facilitating the transaction as well as a service fee for facilitating the prevention of gas tracing as discussed below, may be accomplished as follows.

In some implementations, the payor 110a may wish to transfer f+p tokens as payment 114 for a transaction including the transfer or delivery of assets 112 (or some other service) from payee 110b to payor 110a, f representing the number of payment tokens to be transferred to the payee 110b and p representing the transaction fee to be paid to a third party for facilitating the transaction and service fee for facilitating the prevention of gas tracing as discussed below. For example, at 202, the payor 110a may receive a request for payment (e.g., for f tokens) from the payee 110b. In some cases, the payor 110a may have at least adequate resources to make the payment and accompanying transaction/service fee p. For example, the payor 110a may have exactly f number of tokens in an account on the ZKP-enabled DLN 100 that is controlled by the payor 110a. In some cases, the payor 110a may have at least adequate resources to make the payment and accompanying transaction/service fee p; however, the payor 110a may not have exactly f number of tokens. For example, the tokens of the ZKP-enabled DLN 100 may not be divisible in the sense that if the payor 110a possesses a unit of (f+w) tokens, the payor 110a may have to transfer the entire (f+w) tokens and receive w tokens back to effect a payment of f tokens. As a non-limiting illustrative example, if the amount of the payment 114 is f=4 tokens, but the payor 110a possesses tokens only in the amount of a 3-token unit and a 6-token unit (i.e., the payor 110a possesses adequate amount of tokens to satisfy the payment request, but not possess the exact number of token units requested). In such cases, the payor 110a can make the payment of 4 tokens by transferring a 3-token unit and a 6-token unit (3 tokens+6 tokens=9 tokens), and receiving back 5 tokens. It is to be noted that the payor 110a may transfer any number of tokens, provided that the total number or value of tokens is not less than the number of tokens requested (plus the transaction/service fee), or at least not less than the transaction/service fee (in the case of a partial payment).

In some implementations, "gas-tracing" of a transaction or analysis of payments (including payments of transaction/service fees) to identify details of the transaction including identities of transaction participants (e.g., payor 110a, payee 110b) may be prevented or at least frustrated by using a third party to submit the payments to the smart contract of the ZKP-enabled DLN 100 where the third party has no knowledge of the identity of the transaction participants. For example, the payor 110a may submit a payment (e.g., in the form of a token commitment), among other things, to a relayer so that the relayer can submit the payment to the smart contract of the ZKP-enabled DLN 100 (and get paid the service fee p for his/her service). In such instance, the relayer can pay the miner's transaction fee from the transaction/service fee p. In some implementations, the value of p may be set (e.g., by the smart contract of the ZKP-enabled DLN 100) so as to also prevent or at least frustrate gas-tracing (i.e., an analysis of p to identify the identity of payor 110a, for example). For instance, the value of p may be set to be a constant for at least most transaction participants of ZKP-enabled DLN 100.

In some embodiments, the payor 110a may submit a payment (e.g., in the form of a token commitment), among other things, to a computing node of the relayer (e.g., computing node 102c that is associated with another participant of the ZKP-enabled DLN 100 such as 110c) so that the relayer can submit the payment to the smart contract of the ZKP-enabled DLN 100. The payor 110a may submit the payment to the relayer along with a ZKP that proves that the relayer is the participant of the ZKP-enabled DLN 100 that is intended to facilitate the transfer of the payment to the payee 110b, as discussed below.

In some implementations, the payment 114 to be paid by the payor 110a to the payee 110b as part of a transaction including the asset 112 may be f tokens, and the payor 110a may decide, without loss of generality, to transfer two units of tokens, one including c tokens and another d tokens, where c+d=f+e, where e represents the number of tokens that payor 110a expects to receive back (as a change). As noted above, if the payor 110a in fact possesses exactly f tokens (i.e., possesses a unit of f tokens), then d=e=0 and c=f. In some embodiments, the payor 110a may include p tokens as transaction/service fee to be paid to that relayer that is chosen by the payor 110a to facilitate the transfer of the payment 114 to the payee 110b, as discussed below. That is, the payor 110a may pay f+p tokens, and as such, c+d=f+e+p.

In some implementations, at 204, to transfer the payment 114 from the payor 110a to the payee 110b, the payor 110a may generate or mint, using the computing node 102a, a token commitment that encodes therein the amount of tokens being transferred and at least some aspects of the ownership of the tokens on the ZKP-enabled DLN 100. In some implementations, as there are two token units that may be transferred from the payor 110a as part of the transaction (e.g., units of c tokens and d tokens transferred from payor 110a), two token commitments may be generated by the payor 110a, using the computing node 102a, each token commitment encoding therein aspects of the respective token units and/or ownership of the tokens. For example, the token commitments for the units of c tokens and/or d tokens may include the amounts or values, i.e., c and/or d, respectively, of the tokens in the token commitments. In some implementations, the encoding of the amounts or values of the tokens in the token commitments may be achieved by applying a cryptographic hashing function or algorithm to the amounts or values of the tokens. Further, to encode some aspects of the ownership of the tokens in the token commitments, in some implementations, the cryptographic hashing functions can also be applied to public identifiers on the ZKP-enabled DLN 100 that are associated with the owners of the tokens. For example, as the c tokens and d tokens belong to the payor 110a, in some implementations, the token commitments for each of these units of tokens may include the public identifier on the ZKP-enabled DLN 100 of the payor 110a. An example of the public identifier of the payor 110a includes the public key of the payor 110a on the ZKP-enabled DLN 100 (i.e., the public key that is associated with the payor 110a on the ZKP-enabled DLN 100).

In some embodiments, the cryptographic hashing functions used in generating token commitments can also be applied to random nonces such as, but not limited to, random or serial numbers that are securely generated and used, at least in most cases, only once. In some implementations, a random nonce can be used to differentiate token commitments that represent the same unit of tokens (e.g., encoded by the amount or values of the tokens) and ownership rights of the tokens (e.g., encoded by the public key) independent of the unit of tokens and/or ownership rights. For instance, a first token commitment that represents a given unit of tokens owned by payor 110a on the ZKP-enabled DLN 100 may no longer be valid and a second token commitment may be minted or generated to represent the same unit of tokens owned by the payor 110a. In generating the second token commitment, a random nonce that is different from the random nonce used in generating the first token commitment may be used so that the (new) second token commitment can be differentiated from the (expired or invalid) first token commitment. For example, as noted above and discussed in more detail below, the payor 110a transfers the units of c tokens and d tokens such that f tokens are paid to the payee 110b, e tokens are returned to the payor 110a and p tokens are paid to the relayer as a service fee for facilitating the transaction, where c+d=f+e+p. In such implementations, new token commitments may be generated for the units of f tokens and e tokens while the existing token commitments for the c tokens and d tokens may be nullified or invalidated (since they no longer represent legitimate tokens). In such implementations, the random nonces of the token commitments of the units of c tokens and d tokens can be used to nullify the existing token commitment of the units of c tokens and d tokens, as discussed below.

In some embodiments, the minting or generation of token commitments that represent the units of tokens (e.g., c tokens, d tokens, etc.) on the ZKP-enabled DLN 100 for the first time may include the computation of a token commitment $Z_a=H(S_a \circledast P_{kpayor} \circledast a)$, where a is the amount or values of the units of token (e.g., a=c for the unit of c tokens, a=d for the unit of d tokens, etc.), $P_{kPayor}$ is the public key on the ZKP-enabled DLN 100 that is associated with the payor 110a (i.e., the owner of the tokens), $S_a$ is a random nonce, H is a cryptographic hashing function or algorithm (e.g., SHA-256), and $\circledast$ represents a combining operator (e.g., the concatenation operator |, etc.). In some embodiments, the computation of the token commitment $Z_a$ may include application of the hashing function on additional elements besides or instead of $S_a$, $P_{kPayor}$ and/or a. In some embodiments, the token commitment comprises or consists of a random nonce (e.g., a securely and randomly generated serial number), a public identifier on the ZKP-enabled DLN 100 of the payor 110a (e.g., public key of the payor 110a) and an amount or value of the tokens (e.g., c, d). In some embodiments, the application of the hashing function in computing for the token commitments $Z_a$ allows for the generation or construction of the token commitments without revealing the identities of the random nonce $S_a$, the public key $P_{kPayor}$ and/or a, the amount or value of the tokens on the ZKP-enabled DLN 100. That is, even when the payor 110a generates $Z_a$ using the payor's public account on the ZKP-enabled DLN 100, the random nonce $S_a$, the public key $P_{kPayor}$ and/or a, the amount or value of the tokens, may be kept secret on the ZKP-enabled DLN 100. In some implementations, the token commitment $Z_a$ itself may also be private or secret to payor 110a, i.e., may not be revealed publicly on the ZKP-enabled DLN 100. In some implementations, the generation or minting of the token commitments $Z_a$ may be accomplished off-chain. In some implementations, the tokens c, d (i.e., the payments 114) can be in the form of fungible tokens (e.g., so-called ERC20 tokens of the Ethereum blockchain), and in such implementations, the token commitments $Z_a$ can be fungible token commitments.

As noted above, the payor 110a transfers the units of c tokens and d tokens such that f tokens are paid to the payee 110b, and e tokens are returned to the payor 110a (as change) and p tokens are paid to the relayer as a service fee for facilitating the transaction, where c+d=f+e+p. This may occur, for example, when the tokens of the ZKP-enabled DLN 100 are not divisible without nullifying and minting replacement tokens of the same value (e.g., in the sense that, for instance, a unit of 5 tokens may not be configured to be split into two units of 2 tokens and 3 tokens by the payor 110a for the payor to transfer one of the split units as payment to another account on the ZKP-enabled DLN 100). Accordingly, in some implementations, at 206, the payor 110a may proceed with generating token commitments to represent the unit of f tokens and the unit of e tokens on the ZKP-enabled DLN 100. The token commitment for the unit of f tokens $Z_f$ and the token commitment for the unit of e tokens $Z_e$ may be generated by the payor 110a using the computing node 102a as follows: $Z_f=H(S_f \circledast P_{kPayee} \circledast f)$, $Z_e=H(S_e \circledast P_{kPayor} \circledast e)$ where f and e are the amounts or values of the units of token (i.e., f tokens and e tokens, respectively), $P_{kPayee}$ and $P_{kPayor}$ are the public keys on the ZKP-enabled DLN 100 that are associated with the payee 110b and the payor 110a, respectively, $S_f$ and $S_e$ are random nonces, H is a cryptographic hashing function or algorithm (e.g., SHA-256), and $\circledast$ represents a combining operator (e.g., the concatenation operator |, etc.). The token commitment for the unit of f tokens $Z_f$ may include the public key $P_{kPayee}$ of the payee 110b because the payee 110b is the new owner of the f tokens to whom the f tokens are being transferred as payment. Similarly, the token commitment for the unit of e tokens $Z_e$ may include the public key $P_{kPayor}$ of the payor 110a because the payor 110a is the owner of the e tokens to whom the e tokens are being returned as change.

In some embodiments, the payments to be transferred from the payor 110a to the payee 110b may be non-fungible tokens, and in such cases, the payor 110a may transfer the c tokens (without any d tokens) such that f tokens are paid to the payee 110b (without e tokens being returned to the payor 110a as change). In other words, in some implementations, because non-fungible tokens may not be partitioned and combined to increase or decrease the "amount" of the non-fungible tokens, c=f and there are no units of d tokens to be transferred by the payor 110a (and units of e tokens to be returned to the payor 110a) and no token commitments $Z_d$, $Z_e$ generated to represent the units of d tokens and the units of e tokens on the ZKP-enabled DLN 100, respectively. In the instant application, discussions related to tokens are directed to fungible tokens. The discussions, however, equally apply to non-fungible tokens, with the exception that discussions directed to units of d tokens and unit of e tokens (and their derivatives such as the token commitments $Z_d$, $Z_e$, nullifier $N_d$ (see below), random nonces $S_d$, $S_e$, etc.) do not apply.

In some embodiments, as the combination of the token commitments $Z_c$ and $Z_d$ represent the tokens to be paid by the payor 110a to the payee 110b for the assets and/or services that payee 110b delivered to the payor 110a and the combination of the token commitments $Z_f$ and $Z_e$ represent the tokens to be received by the payee 110b for the assets and/or services, the token commitments $Z_c$ and $Z_d$ would have to be nullified or invalidated before the token commitments $Z_f$ and $Z_e$ are accepted as valid token commitments on the ZKP-enabled DLN 100. In some embodiments, as discussed below, a token commitment is understood or accepted as a valid representation of an asset on the ZKP-enabled DLN 100 when a smart contract on the ZKP-enabled DLN 100 allows the addition of the token commitment onto a token commitments data structure (e.g., a token commitments Merkle tree) on the ZKP-enabled DLN 100 where all valid token commitments are stored. As such, because both pairs, i.e., the pair $Z_c$ and $Z_d$ and the pair $Z_f$ and $Z_e$, represent the same underlying number of tokens, the smart contract would not allow one pair to be added onto the token commitments data structure on the ZKP-enabled DLN 100 if the other pair is already stored on the token commitments data structure, unless the other pair is nullified or invalidated prior to the addition of the one pair. For example, once the pair $Z_c$ and $Z_d$ are added onto the token commitments data structure (e.g., to represent the c+d tokens that the payor 110a intends to use for paying the payee 110b), the smart contract may not allow the addition of the pair $Z_f$ and $Z_e$ to the token commitments data structure prior to the nullification or invalidation of the first pair $Z_c$ and $Z_d$. In other words, for the pair $Z_f$ and $Z_e$ to be added onto the commitments data structure on the ZKP-enabled DLN 100, the pair $Z_c$ and $Z_d$ may have to be nullified, for example, by submitting nullifiers $N_c$ and $N_d$ to the smart contract for addition onto a nullifiers data structure on the ZKP-enabled DLN 100, which may indicate that the pair $Z_c$ and $Z_d$ are no longer valid representations, on the ZKP-enabled DLN 100, of the unit of c tokens and d tokens. In some implementations, the nullifiers data structure on the ZKP-enabled DLN 100 is a data structure (e.g., a Merkle tree) configured for storing all valid nullifiers received by the smart contract on the ZKP-enabled DLN 100, and the presence of a nullifier in the nullifiers data structure indicates that a token commitment that shares the same random nonce as the nullifier is an invalidated token commitment (e.g., the presence of the nullifier $N_c$ in the nullifiers data structure may indicate that the token commitment $Z_c$ that shares the same random nonce as the nullifier $N_c$ is no longer valid on the ZKP-enabled DLN 100).

In some embodiments, at 208, the nullifiers $N_c$ and $N_d$ that are configured to nullify or invalidate the token commitments $Z_c$ and $Z_d$ on the ZKP-enabled DLN 100 can be constructed or generated out of the respective random nonce $S_c$ and $S_d$ that were used to generate the token commitments $Z_c$ and $Z_d$. In some cases, the random nonces $S_c$ and $S_d$, however, may be known to other participants of the ZKP-enabled DLN 100 (i.e., besides the payor 110a), such as a previous owner of the units of c tokens and d tokens. To demonstrate to the smart contract of the ZKP-enabled DLN 100 that the nullifiers are in fact constructed or generated by the payor 110a that has generated token commitments $Z_c$ and $Z_d$ (and not by someone else such as a previous owner of the units of tokens), in some embodiments, the payor 110a may include in the nullifiers $N_c$ and $N_d$ a secret element or identifier that is known only to the payor 110a. For example, in some embodiments, the nullifiers $N_c$ and $N_d$ can be computed via an application of a hashing function H on the random nonces $S_c$ and $S_d$, respectively, and the private key of the payor 110a, $V_{kPayor}$, as follows: $N_c = H(S_c \circledast V_{kPayor})$ and $N_d = H(S_d \circledast V_{kPayor})$, where the combining operator $\circledast$ may include the concatenation operator |, and/or the like.

Upon generating the token commitments $Z_f$ and $Z_e$, the nullifiers $N_c$ and $N_d$, etc., in some embodiments, the payor 110a may wish for the token commitments and the nullifiers to be submitted to the smart contract on the ZKP-enabled DLN 100 as part of the payor's 110a payment 114 to the payee 110b so that the token commitments may be added onto the commitments data structure and the nullifiers may be added onto the nullifiers data structure on the ZKP-enabled DLN 100. The payor 110a, however, may not wish to submit the token commitments and the nullifiers himself/herself (using the computing node 102a, for example) to minimize or avoid the afore-mentioned risk of "gas tracing" where an analysis by third parties of the activities of the payor 110a (e.g., the submission of the token commitments and/or the nullifiers, etc.) reveal details of the transaction that included the payment 114, details such as the identities of the payor 110a and/or the payee 110b, the token commitments $Z_f$ and $Z_e$, the token amounts c, d, e and/or f, and/or the like. In some implementations, the payor 110a may prevent or at least frustrate attempts of "gas-tracing" by using a third party to submit to the smart contract on the ZKP-enabled DLN 100, among other things, the token commitments and/or the nullifiers, where the third party has no knowledge of details of the transaction including the identities of the payor 110a and/or the payee 110b, the token commitments $Z_f$ and $Z_e$, the token amounts c, d, e and/or f, and/or the like. In some embodiments, the third party may be a participant of the ZKP-enabled DLN 100 (e.g., such as 110c) intended by the payor 110a to be the relayer that facilitates the transaction between the payor 110a and the payee 110b. FIG. 2B illustrates the use of an on-chain or on-DLN participant as a relayer of the payment 114 (e.g., along with the token commitments $Z_f$ and $Z_e$, the nullifiers $N_c$ and $N_d$, etc.) to facilitate the transaction between payor 110a and payee 110b.

With reference to FIG. 2B, in some embodiments, the use of an on-chain or on-DLN participant as a relayer of the payment 114 (e.g., along with the token commitments $Z_f$ and $Z_e$, the nullifiers $N_c$ and $N_d$, etc.) to facilitate the transaction between payor 110a and payee 110b is illustrated. In some implementations, at 210, the payor 110a may identify or select a DLN address of a DLN participant that the payor 110a intends to serve as a relayer of the payment 114 to be transferred from the payor 110a to the payee 110b (for the fee of p tokens). The payor 110a may then generate at 212, using the computing node 102a, a zero knowledge proof (ZKP) that proves to the smart contract, upon submission by the relayer (e.g., via the computing node 102c) and verification by the smart contract, that the payor 110a has knowledge of one or more of the following statements: 1) the token commitment $Z_c$ includes the random nonce $S_c$, the public key $P_{kPayor}$ of the payor and/or the unit of c tokens; and the token commitment $Z_d$ includes the random nonce $S_d$, the public key $P_{kPayor}$ of the payor and/or the unit of d tokens; 2) c+d=f+e+p; 3) $N_c$ includes the random nonce $S_c$ and/or the private key $V_{kPayor}$ of the payor; and $N_d$ includes the random nonce $S_d$ and/or the private key $V_{kPayor}$ of the payor; 4) the public identifier $P_{kPayor}$ of the payor can be obtained or computed from the corresponding private identifier $V_{kPayor}$ of the payor; and/or 5) the relayer is the participant of the ZKP-enabled DLN 100 that is intended (by the payor 110a) to relay the payment 114 to the payee 110b (and relay details of the transaction such as the token commitments $Z_f$ and $Z_e$, the nullifiers $N_c$ and $N_d$, etc., to the smart contract). In deriving or generating the ZKP, in some implementations, one or more of the following may be kept secret (i.e., may not be revealed to participants of the ZKP-enabled DLN 100 other than the payor 110a and/or payee 110b, and/or revealed publicly): the identities or identifying parameters of the transaction participants (e.g., the public key $P_{kPayor}$ of the payor 110a, the public key $P_{kPayee}$ of the payor 110b and/or the private key $V_{kPayor}$ of the payor), the tokens amounts or values involved in the transaction such as c, d, f, and/or e, the random nonces $S_c$, $S_d$, $S_e$ and/or $S_f$, and the token commitments $Z_f$ and/or $Z_e$ (including the fact that the public keys $P_{kPayee}$ and $P_{kPayor}$ are included in $Z_f$ and $Z_e$, respectively).

In some implementations, the ZKP that the relayer is the participant of the ZKP-enabled DLN 100 that is intended by the payor 110a to facilitate the transaction (e.g., by relaying the payment 114 to the payee 110b and details of the transaction such as the token commitments $Z_f$ and $Z_e$, the nullifiers $N_c$ and $N_d$, etc., to the smart contract) may be accomplished by generating the ZKP with the DLN address of the relayer as a public input of the ZKP. In such cases, the payor 110a may privately/anonymously provide the relayer the secret witness input of the ZKP that is related to or associated with the public input, along with the ZKP. An example of this secret witness input can be a hashed value of the public input, i.e., a hashed value of the DLN address of the relayer. In such cases, verification of the ZKP proves that the relayer is the participant of the ZKP-enabled DLN 100 that the payor 110a intended to facilitate the transaction because the ZKP would otherwise fail to verify for any other secret witness input that is different from the secret witness input provided by the payor 110a.

In some embodiments, after the generation of the token commitments $Z_f$ and $Z_e$, the nullifiers $N_c$ and $N_d$, the ZKP, etc., at 214, the payor 110a may submit to the computing node of the relayer (e.g., to the computing node 102c of 110c) anonymously, using the computing node 102a or a computing node (not shown) that is not part of the ZKP-enabled DLN 100, the token commitments $Z_f$ and $Z_e$, the nullifiers $N_c$ and $N_d$ and/or the ZKP. In return, the relayer may submit, via the computing node of the relayer (e.g., via computing node 102c of ZKP-enabled DLN 100 participant 110c) to the smart contract of the ZKP-enabled DLN 100 the token commitments $Z_f$ and $Z_e$, the nullifiers $N_c$ and $N_d$ and/or the ZKP. At 216, in some implementations, the smart contract may verify the ZKP. That is, the smart contract may compute the ZKP to verify the aforementioned statements included in the ZKP. Upon verification of the ZKP, in some implementations, the smart contract may allow the addition of the token commitments $Z_f$ and $Z_e$ onto the token commitments data structure (e.g., a token commitments Merkle tree) on the ZKP-enabled DLN 100 and the nullifiers $N_c$ and $N_d$ onto the nullifiers data structure on the ZKP-enabled DLN 100. Further, in some implementations, the smart contract may allow for the relayer to be paid p tokens for the relayer's service of submitting the token commitments $Z_f$ and $Z_e$, the nullifiers $N_c$ and $N_d$ and/or the ZKP, etc., to the smart contract (e.g., the smart contract may transfer the p tokens to the account of the relayer on the ZKP-enabled DLN 100 that has an address that matches the public input). Note that p tokens paid to the relayer are provided to the smart contract by the payor 110a when Zc and Zd are minted and c+d is paid to the smart contract by the payor 110a. Thus, the smart contract makes the payment of the p token to the relayer when the relayer submits the token commitments $Z_f$ and $Z_e$, the nullifiers $N_c$ and $N_d$ and/or the ZKP, etc., to the smart contract (and the ZKP is verified). In some implementations, the relayer may wish to verify the ZKP himself/herself first before or instead of submitting the token commitments $Z_f$ and $Z_e$, the nullifiers $N_c$ and $N_d$ and/or the ZKP, etc., to the smart contract (e.g., to avoid submitting a ZKP that would fail verification and be rejected by the smart contract, which would be a waste of the relayer's resources as the relayer would not be paid for failed verifications). Further, the payor 110a may have submitted multiple transactions (e.g., including the aforementioned commitments, nullifiers, ZKPs, etc.) to multiple relayers, each ZKP generated using a DLN address of a respective relayer as discussed above. In such cases, the first relayer to submit a transaction to the smart contract would be the one to receive the p tokens. Upon verifying the submitted ZKP, in some implementations, the smart contract may allow the addition of the token commitments $Z_f$ and $Z_e$ onto the token commitments data structure and the nullifiers $N_c$ and $N_d$ onto the nullifiers data structure, and proceed with paying the relayer (e.g., pay p tokens). The transactions submitted by the rest of the relayers after the submission of the first relayer (and verification of the related ZKP by the smart contract) may be rejected by the smart contract, because the smart contract would discover, upon checking the nullifiers data structure, that the nullifiers $N_c$ and $N_d$ are already present in the nullifiers data structure (because they were already submitted by the first relayer to the smart contract that added the nullifiers into the nullifiers data structure after the ZKP submitted by the first relayer was verified). In some implementations, the use of a relayer as discussed in the instant application facilitates the prevention or at least reduction of "gas tracing" for transaction conducted between payor 110a and payee 110b because the relayer and the payor 110a have no apparent relationship that can be exploited by those performing an analysis of transaction payments submitted by the relayer to the smart contract (e.g., in the form of token commitments transferred from the payor 110a to the payee 110b) to identify details of the transaction.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters and configurations described herein are meant to be exemplary and that the actual parameters and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   receiving, at a processor, a request associated with a transaction on a distributed ledger-based network (DLN), the request including a representation of a first asset token, a representation of a payor account on the DLN, and a representation of a payee account on the DLN, the first asset token represented on the DLN by a payor token commitment generated by a payor computing node of the DLN and by an application of a cryptographic hashing function to a first random nonce,
   commiting a payment, in response to the request associated with the transaction, la generating, via the processor, a payee token commitment via an application of a cryptographic hashing function to: (i) a second asset token, (ii) a public identifier on the DLN of the payee, and (iii) a second random nonce;
   invalidating the payor token commitment, after comitting the payment, by generating, via the processor and in response to the request, a nullifier in a nullifiers data structure on the DLN via an application of a cryptographic hashing function to a concatenation of: (i) the first random nonce and (ii) a private identifier of the payor, the nullifiers data structure including a Merkle Tree;
   transmitting, via the processor and to a relayer computing device, a representation of a zero-knowledge proof (ZKP) generated using a DLN address of the relayer computing device as a public input of the ZKP, to cause the relayer computing device to verify that:
   (1) the payee token commitment includes the second asset token, the public identifier on the DLN of the payee, and the second random nonce; and
   (2) the nullifier includes the first random nonce and the private identifier of the payor,
   the relayer computing device being a third-party participant of the DLN that has no information about an identity of the first random nonce, an identity of the second asset token, an identity of the public identifier on the DLN, and an identity of the second random nonce, and
   receiving, at the processor, a confirmation confirming the transfer of the first asset token from the payor account to the payee account, the confirmation being generated in response to verification of the ZKP by a smart contract.

2. The method of claim 1, wherein the relayer computing device is part of the DLN and associated with a third-party participant of the DLN, and the ZKP includes a DLN address of the third-party participant of the DLN, the DLN address being a public input of the ZKP.

3. The method of claim 1, wherein the relayer computing device is not part of the DLN.

4. The method of claim 1, further comprising:
   sending, via the processor, a transaction fee to the relayer computing device; and
   paying the transaction fee to a third party for transmitting the ZKP from the relayer computing device to a self-executing code segment on the DLN for the ZKP to be verified by the self-executing code segment.

5. The method of claim 1, further comprising:
   sending, via the processor, a transaction fee to the relayer computing device; and
   paying the transaction fee to a third party for transmitting the ZKP from the relayer computing device to a self-executing code segment on the DLN for the ZKP to be verified by the self-executing code segment, the transaction fee configured such that a provider of the transaction fee is hidden.

6. The method of claim 1, wherein:
   the public identifier on the DLN of the payor is a public key of a key pair; and
   the private identifier of the payor is a private key of the key pair.

7. The method of claim 6, further comprising
   sending a ZKP that the private key of the payor is derivable from the public key.

8. The method of claim 1, wherein the receiving the confirmation is performed after the payee token commitment has been added by a self-executing code segment on the DLN onto a token commitments data structure on the DLN.

9. The method of claim 1, wherein the receiving the confirmation is performed after the nullifier has been added by a self-executing code segment on the DLN onto the nullifiers data structure on the DLN after the self-executing code segment verifies an absence of the nullifier from the nullifiers data structure.

10. The method of claim 1, wherein the DLN is Ethereum blockchain platform and the first asset token and/or the second asset token are Ether coins.

11. The method of claim 1, wherein the first asset token and the second asset token are non-fungible tokens,
    the ZKP further including a proof that the first asset token and the second asset token represent on the DLN a common underlying physical asset.

12. The method of claim 1, wherein the first asset token and the second asset token are non-fungible tokens,
    the ZKP further including a proof that each of the first asset token and the second asset token is obtained via an application of a cryptographic hashing function to an identifying parameter of a common underlying physical asset.

13. The method of claim 1, wherein the first asset token and the second asset token are fungible tokens,
    the ZKP further including a proof that a value of the first asset token is equal to a value of the second asset token.

14. The method of claim 1, wherein the payor token commitment is a first payor token commitment, the method further comprising:

generating, via the processor, a second payor token commitment via a application of a cryptographic hashing function to a third asset token and a public identifier on the DLN of the payor; and generating, via the processor, a change token commitment via an application to a cryptographic hashing function on a fourth asset token and a public identifier on the DLN of the payor, a sum of a value of the first asset token and a value of the third asset token being equal to a sum of a value of the second asset token and a value of the fourth asset token.

15. The method of claim 1, wherein the payor token commitment is a first payor token commitment, the method further comprising:

generating, via the processor, a second payor token commitment via a application of a cryptographic hashing function on a third asset token and a public identifier on the DLN of the payor; and generating, via the processor, a change token commitment via an application of a cryptographic hashing function to a fourth asset token and a public identifier on the DLN of the payor, a sum of a value of the first asset token and a value of the third asset token being equal to a sum of a value of the second asset token and a value of the fourth asset token; and the ZKP further including a proof that the sum of the value of the first asset token and the value of the third asset token equals the sum of the value of the second asset token and the value of the fourth asset token.

* * * * *

UNITED STATES PATENT AND TRADEMARK OFFICE
CERTIFICATE OF CORRECTION

PATENT NO. : 11,232,439 B2
APPLICATION NO. : 16/869944
DATED : January 25, 2022
INVENTOR(S) : Duncan James Westland Page 1 of 1

It is certified that error appears in the above-identified patent and that said Letters Patent is hereby corrected as shown below:

In the Claims

Column 17, Line 36 (Claim 1, Line 12): "la generating" should read --by generating--
Column 19, Line 2 (Claim 14, Line 5): "a application" should read --an application--
Column 19, Line 16 (Claim 15, Line 5): "a application" should read --an application--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*